May 18, 1965
T. L. SMITH ETAL
3,183,938
LOW BOLT PIPE REPAIR CLAMP
Filed Sept. 8, 1961
4 Sheets-Sheet 1
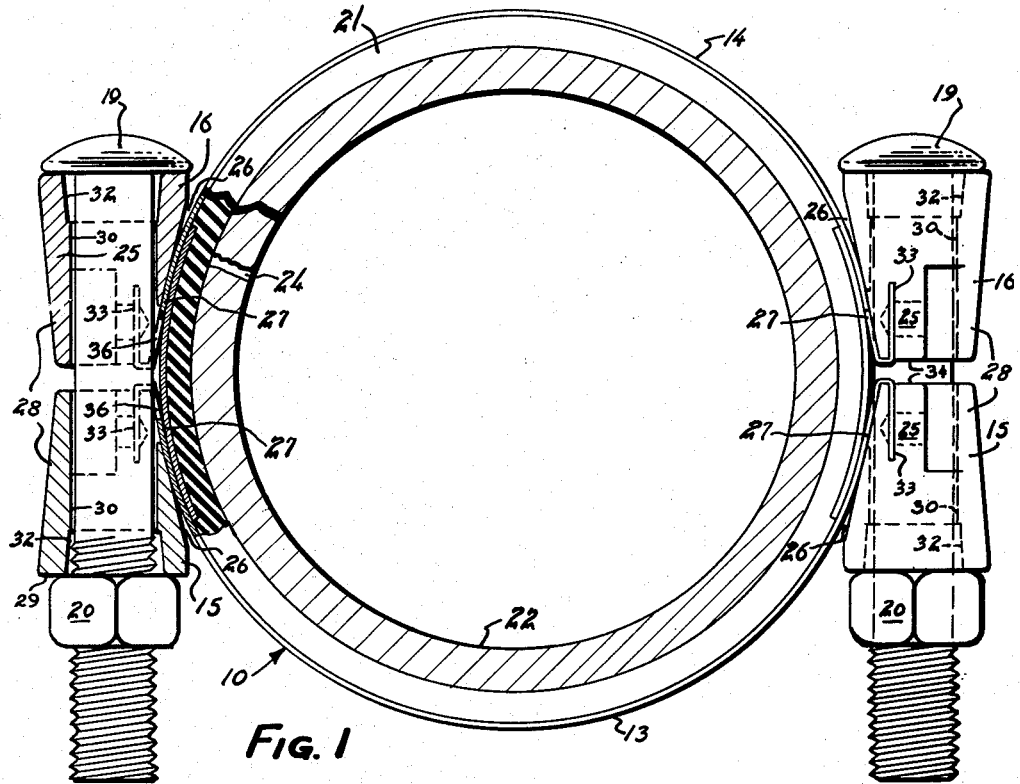
FIG. 1
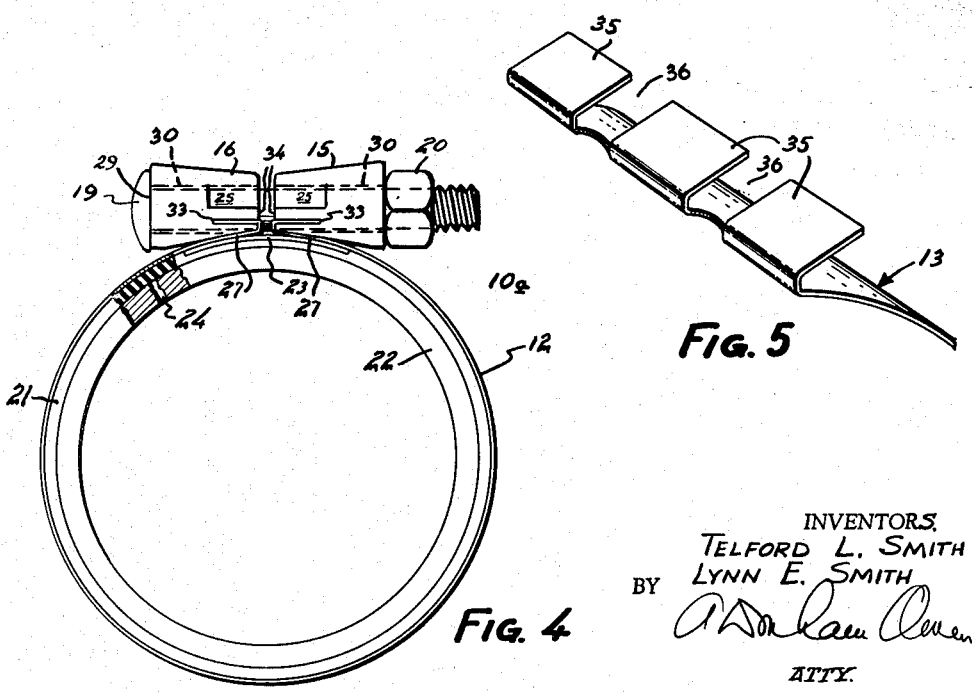
FIG. 4
FIG. 5
INVENTORS.
TELFORD L. SMITH
LYNN E. SMITH
BY
ATTY.

May 18, 1965  T. L. SMITH ETAL  3,183,938
LOW BOLT PIPE REPAIR CLAMP
Filed Sept. 8, 1961  4 Sheets-Sheet 2

INVENTORS.
TELFORD L. SMITH
BY LYNN E. SMITH

ATTY.

May 18, 1965
T. L. SMITH ETAL
3,183,938
LOW BOLT PIPE REPAIR CLAMP
Filed Sept. 8, 1961
4 Sheets-Sheet 3
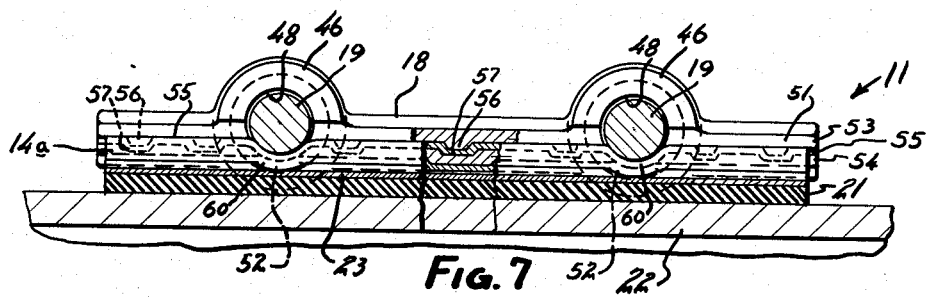
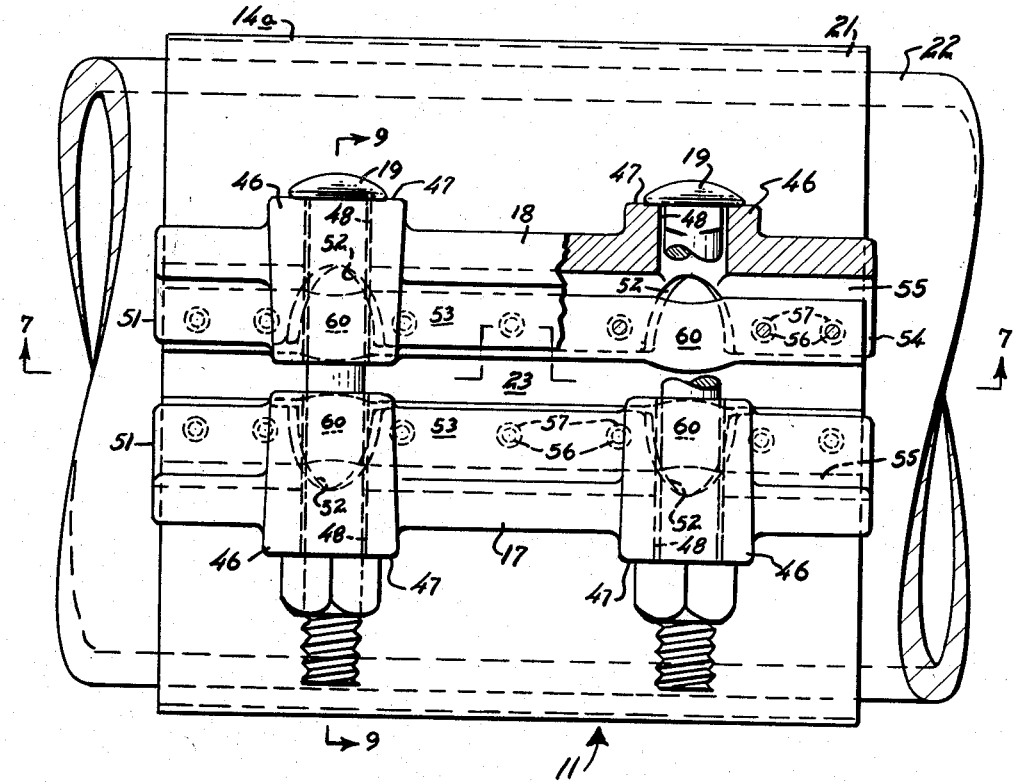
INVENTORS.
TELFORD L. SMITH
BY LYNN E. SMITH
ATTY.

May 18, 1965

T. L. SMITH ETAL 3,183,938

LOW BOLT PIPE REPAIR CLAMP

Filed Sept. 8, 1961

INVENTORS.
TELFORD L. SMITH
BY LYNN E. SMITH

ATTY.

United States Patent Office 3,183,938
Patented May 18, 1965

3,183,938
LOW BOLT PIPE REPAIR CLAMP
Telford L. Smith and Lynn E. Smith, both of
1525 Kensington Circle, Los Altos, Calif.
Filed Sept. 8, 1961, Ser. No. 136,803
7 Claims. (Cl. 138—99)

This invention relates to repair devices for conduit lines and more particularly it relates to pipe repair clamps and pipe couplings of the type in which malleable or flexible metal bands are wrapped around the pipe like a sleeve, fitted at their ends with clamping lugs, and clamped tightly in place by bolts that pass through the lugs.

A long standing problem with pipe repair clamps of the malleable band type has been that of providing a clamp capable of exerting the force necessary to tighten the band and compress the gasket under the band. In the early prior art clamps this clamping force was often difficult to achieve because, as the bolts were tightened, there was tendency for the lugs to roll inwardly toward each other and consequently for the bolts to bend before the required gasket pressure could be reached.

Those skilled in the pipe repair clamp art have long grappled with this bolt-bending problem, but heretofore all prior art clamps specifically devised to overcome it entailed relatively complicated lug designs. One such type of prior art lug utilized arms extending outwardly from each lug, about which a mating lug could pivot while the lugs were being drawn together. Such lugs did prevent some bolt bending but their basic lever arrangement made it necessary to apply more torque per bolt to obtain the same bolt force without the lever arms. Another general type of clamp in the prior art utilized torque arms on each lug that extended across and were supported by an opposite lug to thereby prevent the lugs from rolling and the bolts from bending as they were tightened.

Although some of these prior art clamps provided a certain degree of success in stopping bolt bending, in all cases they required additional auxiliary structural members on the lugs that caused the lugs to have their relatively complicated shapes. These lug configurations were thus more difficult to cast and machine, they required closer tolerances, and hence they were more expensive to manufacture. Another difficulty with such prior art clamps was that in some cases the extending structural members were subject to breakage or failure either during handling or after being in the ground as a result of corrosion effects, and such a failure on an installed clamp could cause the leak to reopen. Still another disadvantage with prior art clamping lugs was that the auxiliary arms extending outwardly required extra space in the hole around the pipe and therefore the installation of the clamp was more difficult.

Therefore one principal object of the present invention is to provide a lug structure for a pipe repair clamp of the malleable band type that eliminates the problem of bolt bending and lug rolling without the need for auxiliary pivot arms or torque fingers.

From an analysis of the forces present in a pipe-repair clamp of the malleable band type, it can be ascertained that a basic cause of bolt-bending and the inward rolling tendency of the lugs in prior art clamps was the fact that the force exerted on each lug by the bolts and nuts in pushing the lugs together was separated by a relatively large moment arm from the opposing force caused by the resistance of the end of the band pulling on that lug. Prior to the present invention no prior art clamp provided a solution to this problem of reducing to a negligible amount the moment arm between these opposing forces, so that no bolt-bending would occur as the bolts were tightened.

Therefore, another important object of the present invention is to provide a pipe repair clamp having a novel arrangement of components in which the force of the bolts and nuts acting to bring opposing lug members together is substantially aligned with the resistance forces caused by the ends of the band pulling on the lug, so that the bolt-bending or lug-tipping moment is substantially eliminated.

Still another object of our invention is to provide a lug for a pipe repair clamp that is inexpensive to manufacture. By eliminating the twisting moment on the lug, the need for any auxiliary, antibolt-bending protuberances, arms, or fingers has been eliminated, and the lugs according to the present invention can have a compact, relatively simple configuration, and thus be free from complicated fabrication problems.

Another object of the present invention is to provide a pipe clamp that lies close to the surface of the pipe allowing it to be installed in areas having limited clearance around the pipe.

Another object of the invention is to provide a pipe clamp with bolts that are located close to the pipe surface and having lugs which can be attached to a flexible band by means of either a milled slot or a cast slot with malleable jaws.

Other objects and advantages will become apparent from the following detailed description of the invention in accordance with 35 U.S.C. 112, but limited in scope only by the appended claims.

In the drawings:

FIG. 1 is a view in end elevation of one embodiment of a pipe clamp in accordance with the principles of the present invention, shown installed around a pipe with one pair of lugs shown in section;

FIG. 4 is a view in end elevation showing a pipe clamp embodying principles of the invention having a single malleable band connected by one pair of lugs;

FIG. 5 is a fragmentary view in perspective showing one end of the flexible band for the pipe clamp of FIGS. 1 to 3;

FIG. 6 is a plan view of a slightly modified form of pipe clamp embodying principles of the invention;

FIG. 7 is a view in side elevation and in section of the pipe clamp of FIG. 6 and taken along the line 7—7 of FIG. 6;

Figure 3:
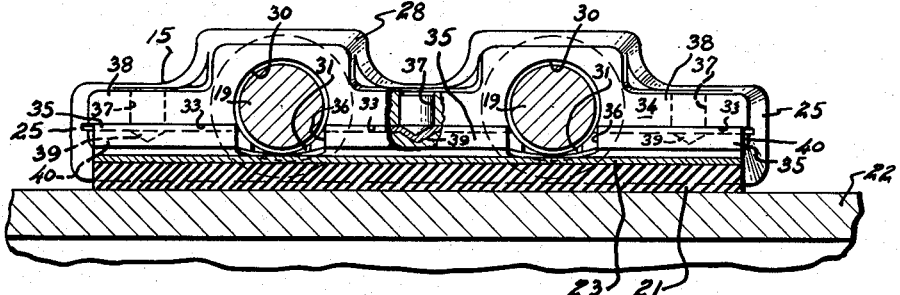
FIG. 3 is a view in side elevation and in section of the upper portion of the pipe clamp of FIG. 1 and taken along the line 3—3 of FIG. 2.

In broad terms, the present invention provides a clamp exemplified by either of two embodiments indicated generally by the numerals 10 (FIG. 1) and 11 (FIG. 6) each of which may embody either a one-piece malleable band 12 (FIG. 4) or a pair of semi-circular malleable bands 13 and 14 (FIG. 1) that encircle the pipe. Each band 12, 13, 14 is attached at its ends to a pair of lugs 15 and 16 (FIGS. 1–4) or lugs 17 and 18 (FIGS. 5–10)

that are arranged in matching pairs and are tightened together by bolts 19 and nuts 20. These pull the one-piece band 12 or the two-piece bands 13 and 14 tight around a gasket 21 or directly around the pipe 22, if and when that is desired. Preferably a gasket 21 is used, and preferably it is provided with an armoring strip 23 adjacent the bite of each pair of lugs. A typical hole or crack in the pipe 22 that is sealed by the gasket 21 is indicated by a numeral 24 in FIGS. 1 and 4.

In accordance with the principles of the invention and in each of the embodiments thereof, the lugs 15, 16, 17, 18 have a novel configuration and are combined with the ends of the one-piece band 12 or the two-piece bands 13 and 14 so that the bolts 19 connecting each pair of lugs will lie closely adjacent to the outer pipe surface. By virtue of this novel arrangement of elements, the force exerted on the lugs to draw the ends of the malleable band together will lie along a line close to the pipe surface and substantially aligned with the reactive forces on the ends of the bands 12, or 13 and 14. Thus any tendency for these opposing forces to twist the lugs and for the bolts 19 to bend during tightening is eliminated, and maximum sealing pressure on the gasket 21 can be achieved.

As shown on the modified form of clamp 10a in FIG. 4, the single circular, malleable band 12 may be used with only one set of lugs 15 and 16, if the band 12 is sufficiently flexible and can be deformed to spread its ends by an amount necessary to pass it over the pipe. Such clamps using the one-piece malleable band 12 are often used for relatively small leaks such as the "pinhole" type rather than the more serious longitudinal or circumferential cracks. For such small localized leaks a small patch-like gasket (not shown) covering only the leak area may be used.

In the form of the invention shown in FIGS. 1–5 each of the lugs 15, 16 according to the invention are formed with a base portion 25, which is preferably tapered somewhat in cross-section so that its lower surface 26 will be sloped, and will engage a portion 27 of the band 13 or 14 near its end when the lugs are close together with the band tightened (see FIG. 1). Spaced apart on the base portion 25 of each lug 15 or 16 are integral boss-like portions 28 that provide the necessary lug thickness for supporting the bolts 19. The lugs 15 and 16 can have any number of boss-like portions 28 depending on the length of the clamp that is desired. In some instances, particularly where an aforementioned patch-type gasket is used for small leaks, each lug would have only one boss-like portion to accommodate a single bolt.

Along the rear of each lug 15 and 16 a bearing surface 29 is provided, and extending inwardly from the surface 29 through each boss-like portion 28 is a bolt hole 30 which also cuts partially through the base portion 25 forming a curved cutout portion 31 having a relieved edge along the lower surface 26 of each lug. Each bolt hole 30 preferably has a square countersunk portion 32 to accommodate carriage type bolts 19.

Figure 2:
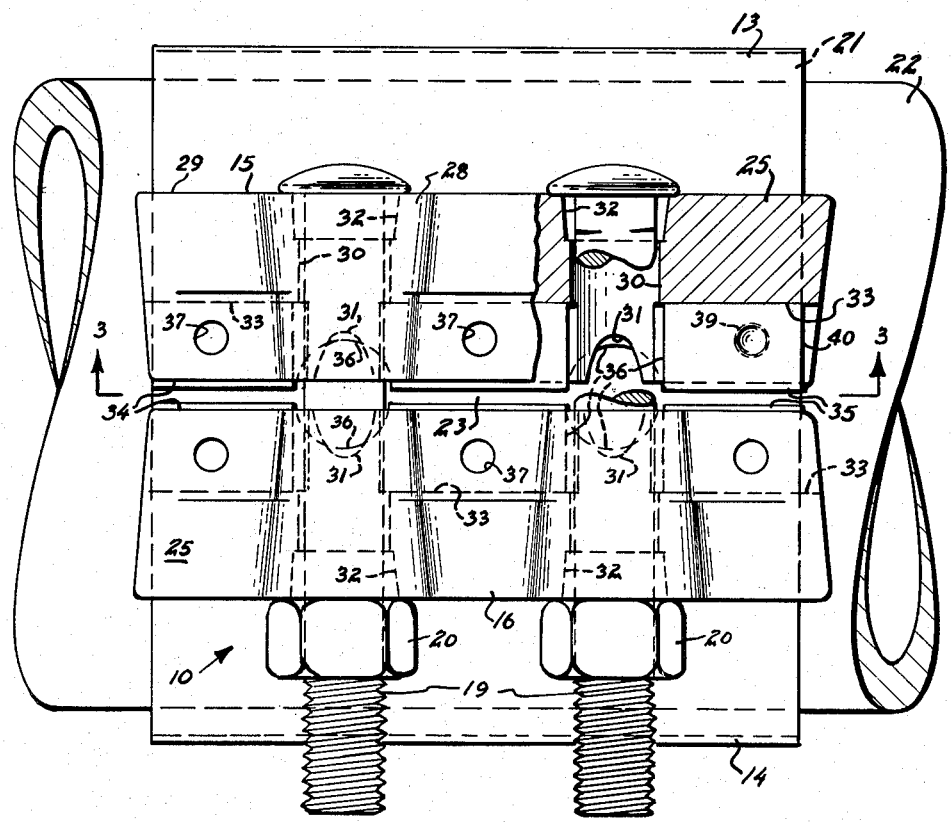
FIG. 2 is a plan view of the pipe clamp of FIG. 1 showing one pair of lugs.

On each of the lugs 15 and 16 a slot 33 is formed longitudinally across an inner face 34 directly opposite the opposing lug. As shown in FIGS. 2 and 3, each slot 33 is preferably located near the middle of the inner face 34 and extends across the bolt holes 30 as well as laterally a predetermined distance into the base portion 25 of each lug 15 and 16.

In the embodiment of FIGS. 1–5, the flexible band members 13 and 14 are bent back at their ends to form hook portions 35. These hook portions 35 are adapted to fit within the slots 33 provided along the inner lug face 34 and are attached firmly to the lug members 15 and 16. As shown in FIG. 5, the hook portions 35 on the ends of each band 13 and 14 are provided with slots or cutouts 36 which are spaced apart to align with the bolt holes 30 of each lug 15 and 16. These slots 36 are cut completely through the hook portions 35 of the bands 13 and 14, and as shown, they may extend back along the curved end 27 of the band to provide adequate bolt clearance. Thus, when the hook portions 35 are in place in the slots 33 of the lugs 15 and 16, the bolts 19 will lie in and pass through the slots 36 in the band 13 or 14 so that the ends of the band are pulling on the lugs 15 and 16 along a line that is substantially tangential with the lower surfaces of the bolts 19. Stated another way, in our invention the lower bolt surfaces are located with respect to the ends of the band at the point the hook portions 35 are bent up and radially away from the pipe surface. With this arrangement, the lug-rolling or bolt bending tendency is essentially eliminated.

In the present invention the lugs may be made from cast metal such as grey cast iron or from some suitable malleable cast material. With lugs formed from grey cast iron as shown in the embodiment of FIGS. 1–5, the slots 33 are preferably formed to the desired depth and width by milling the lug castings. To attach the band members 13 and 14 on the lugs 15 and 16 having the milled slots 33, holes 37 are bored at spaced apart locations between the bolts 19 in an upper part 38 of each base portion 25. Also, a series of recesses 39, each aligned with a said hole 38, are provided in a lower base portion 40. The hook portions 35 of each band 13 and 14 are then inserted in the slots 33 of each lug 15 and 16 with their recesses 36 aligned with the bolt holes 30. The band is then dimpled by an appropriate tool through the holes 38 or a plug is forced into the holes 38 to form a detent in each recess 39, and this retains the band in the slot 33 against the pulling force when the bolts are tightened.

If a malleable cast metal material is used to form the lugs, the malleable bands may be attached in a different manner, and this is shown in conjunction with the embodiment of FIGS. 6–11.

Figure 8:
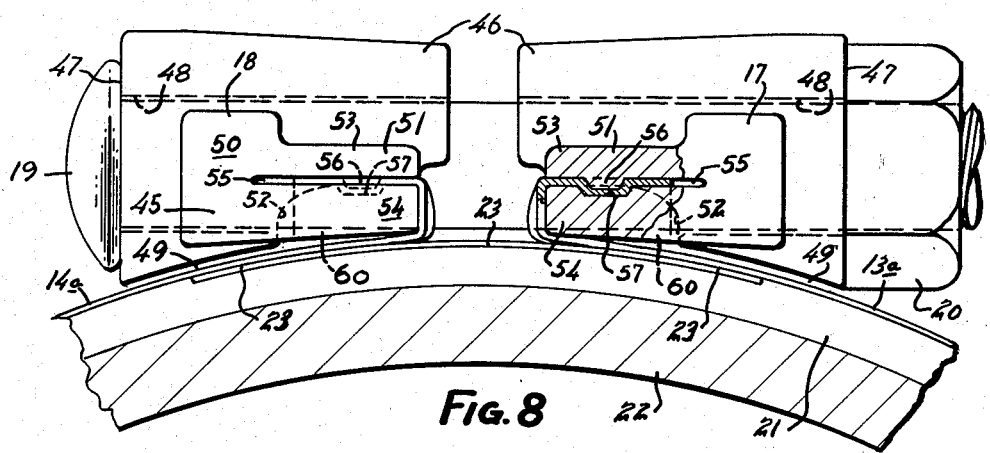
FIG. 8 is an enlarged view in end elevation and partially in section of one pair of lugs of the pipe shown in FIG. 6.
Figure 9:
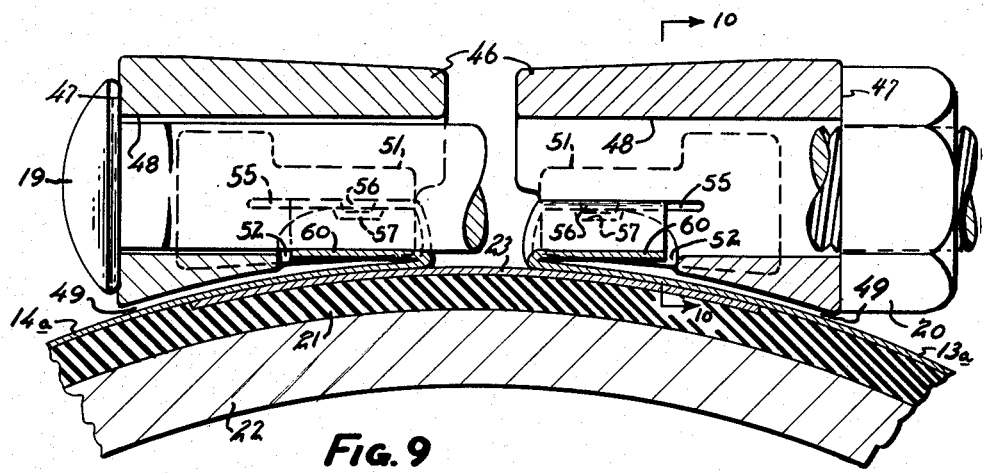
FIG. 9 is an enlarged view in end elevation and in section of the lugs of FIG. 6, taken along the line 9—9 of FIG. 6.

In FIG. 6, a pair of lugs 17 and 18 embodying principles of the invention but somewhat modified in form are shown, each lug comprising generally a lug base member 45 to which are attached integral spaced apart bolt-supporting boss members 46. Each boss member 46 may be barrel shaped and it preferably extends both rearward and forward from the base member 45, having an annular rear bearing face 47 to support the head of a bolt 19. Each boss member 46 is also provided with a bolt hole 48 similar to the bolt holes 30 of the lugs 15 and 16. As shown in FIGS. 8 and 9, the lower portion of each boss member 46 preferably extends below the base member 45 and has a lower surface 49 which is preferably beveled to provide clearance for the lugs 17 and 18 so that they can lie close to the pipe surface without interfering with it as they are brought together (see FIGS. 8 and 9).

The base member 45 has a rear portion 50 having a substantial thickness that provides the main structural strength in the longitudinal direction for the lugs 17 and 18 and between the boss members 46. Forward of the rear portion 50 is a jaw portion 51 of somewhat less thickness. In extending through the boss members 46, the bolt holes 48 also cut through the base member 45 on the lower side of its jaw portion 51, so that a series of curved recesses or cutouts 52 are formed along the inner edge of the lugs 17 and 18. The cutouts 52, in providing a means for the bolts 19 to lie close to the pipe surface, do not detract from the strength of the base member 45 because they do not penetrate its rear portion 50.

Figure 11:
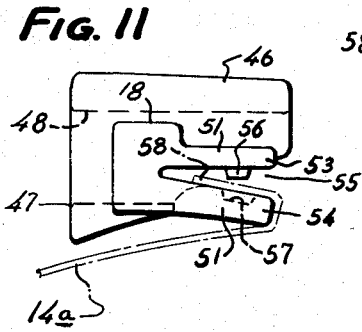
FIG. 11 is a view in elevation of one lug of the pipe clamp in FIGS. 6–10, showing the lug jaws before being closed to retain the band.

As shown in FIG. 11, the lugs 17 and 18 are originally formed by casting them with the jaw portion 51 in the opened position, forming an upper and a lower jaw member 53 and 54 respectively, that, between them, form a tapered slot 55. Spaced apart at intervals along preferably the upper jaw member 53 are integral pin members 56 which become aligned with mating recesses 57 in the lower jaw member 54 when the jaws 53 and 54 are closed. To achieve the necessary tolerances in the casting of the lugs 17 and 18, the well known shell molding casting technique is used. With such methods, the lugs can be cast and completed without having to be machined in any way.

Figure 10:
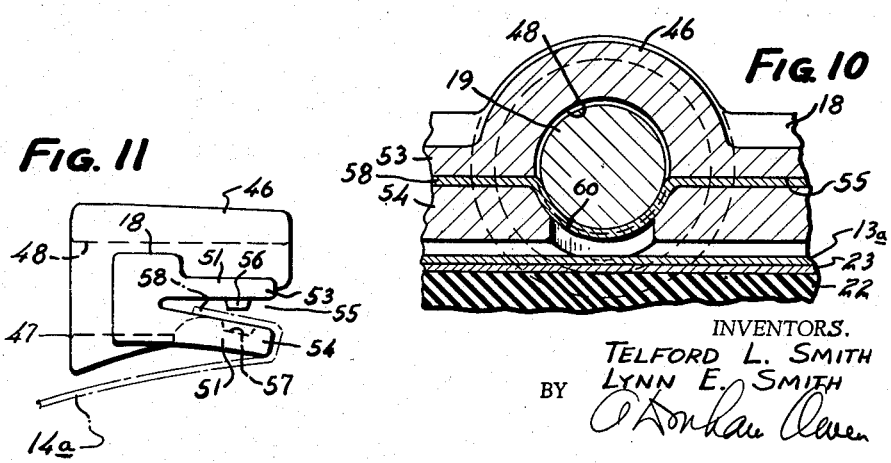
FIG. 10 is a fragmentary view in section taken along the line 10—10 of FIG. 9.

In attaching a malleable band to the lugs 17 and 18, the slotted band 13 or 14 of FIG. 5 can be used if desired, but we prefer to use unslotted bands 13a and 14a (or a single band 12a) in combination with the lugs 17 and 18 and to form integral semi-circular recesses 60 that fit around the bolts 19 when the band ends are in place. This feature of our invention eliminates the time and labor required for slotting the band and it also provides a somewhat stronger lug and band combination. To attach the band as shown in FIGS. 7–11, the end of the band 13a is preferably inserted into the tapered slot 55 of each of the lugs 17 and 18 between the open jaw members 53 and 54, and, with a mandrel placed in each bolt hole 48 of a boss member 46, a force is applied to simultaneously close the jaws 53 and 54 and to form the unslotted band end 58 around the mandrels. During such an operation the integral pin members 56 deform the band members 13a and 14a and form detents 59 in the aligned recesses 57 (FIG. 9). And at the same time the semi-circular portions 60 having a slightly greater diameter than the bolts 19 are formed on the end of the bands 13a and 14a around each boss portion 46, as shown in FIG. 10.

From the foregoing, the manner of applying the pipe clamps 10 and 11 of both embodiments of the invention is believed to be obvious. For example, with the clamp 10 of FIGS. 1–5, the bands 13 and 14 are attached to the lugs 15 and 16 in the aforesaid manner and the clamp 10 is ready for installation on the pipe 22. The bolts 19 are then inserted and tightened to compress the bands 13 and 14 against the gasket 21. As the gasket 21 is deformed and pressed against the pipe the ends of the bands 13 and 14 exert a reaction force substantially near the lower surface 26 of each lug 15 and 16. The bolts 19 and nuts 20 on the lugs 15 and 16 exert a counteracting force to overcome the pull of the bands 13 and 14, thereby causing the lugs 15 and 16 to move together and tighten the band. The force of each bolt 19 and nut 20 is generally equally applied around the bolt hole 30 on the rear surface 29 of each lug 15 and 16, and this force therefore acts substantially along the axis of each bolt 19. Because of the novel lug configuration and the location of the band when it is attached to the lug in accordance with the present invention, the axis along which the bolt force acts and the line along which the band ends are pulling on the lugs are substantially aligned. Thus the combination of these forces can produce only a relatively small moment, which is not large enough to cause any significant lug tipping or to bend the bolts 19. For all practical purposes, the bolt force and the band pull oppose each other along the same line, and with this arrangement, almost all the bolt force is utilized to bring the band ends together and to compress the gasket, and, the bolt-bending and lug-tipping problems have been eliminated.

The present invention provides a clamp structure that is relatively simple in form and yet because of its novel arrangement of elements, it provides new and highly advantageous results. Compared with prior art pipe repair clamps, greatly increased amounts of force can be applied with the clamp 10 to compress the gasket 21 tightly without bending the bolts 19. Therefore, leaks can be stopped more easily in conduits even where the internal fluid pressure is set relatively high. Moreover, this force is applied directly to tighten the band with the lug structure that does not require any auxiliary extra protruding members which must engage and act as levers to overcome bolt bending.

To those skilled in the art to which this invention relates, many changes in construction and widely differing embodiments and application of the invention will suggest themselves without departing from the spirit and scope of the invention. The disclosures and the description herein are purely illustrative and are not intended to be in any sense limiting.

We claim:

1. A pipe repair clamp comprising a flexible band member, said band member having bent back portions at the ends thereof, a pair of rigid lugs for said band member, each lug having a main body portion and integral spaced apart boss members thereon, each said lug having a bolt hole extending through each said boss portion and a slot means for retaining a said bent back portion of said band, each said slot means extending longitudinally along said body portion and across said bolt holes on one side of said lugs, and bolts extending through said bolt holes in said lugs, means in the bent back portions of said band member for forming recesses aligned with said bolt holes, said bolts lying closely adjacent to the outside surface of the pipe being repaired and being thereby adapted when tightened to apply a force on said lugs along a line substantially in alignment with the tension forces of said band pulling on said lugs from a point adjacent said bolts.

2. A pipe repair clamp comprising a malleable band member, said band member having end portions that are bent up and bent back to form hook members thereon, a pair of rigid lugs for said band member, and a plurality of bolts for drawing said lugs together to tighten said band member around a pipe, each lug having a main body portion and integral spaced apart boss members thereon, each said lug having a bolt hole extending through each said boss portion and also partially through said main body portion, a slot means for retaining said bent back portions of said band, said slot means extending longitudinally along said body portion and across said bolt holes on one side of each said lug and providing means for gripping a said hook member, and bolts extending through said bolt holes in each said lug for connecting opposing lugs, both of said band end portions in said slot means having spaced apart recesses aligned with said bolts, thereby enabling said bolts to lie closely adjacent to the outside surface of the pipe being repaired with the lower surfaces of the bolts substantially tangent to said band at said end portions, said bolts being thereby adapted when tightened to apply a force on said lugs along a line substantially in alignment with the tension forces of said band pulling on said lugs.

3. A pipe repair clamp comprising a flexible band member, said band member having a first bend outward and a second bend backward to form a hook member at each end thereof, a pair of rigid lugs for said band member, each lug having a generally wedge-shaped main base portion with a sloped underside and integral spaced apart boss members thereon, extending above its upper side, a bolt hole extending through each said boss portion and partially through said base portion, a slot means for retaining said bent back portions of said band, said slot means extending longitudinally along said main base portion and transversely across said bolt holes, and bolts extending through said bolt holes in said lugs, and through the hook members of said band member, said bolts being positioned by said lugs so that their inner edges are substantially in a plane that lies closely adjacent to the outside surface of the pipe being repaired, said bolts being thereby adapted when tightened to apply a force on said lugs along a line substantially in alignment with the tension forces of said band pulling on said lugs.

4. The clamp described in claim 3 wherein said band member has cutout portions removed from its said hook members, said cutouts being spaced apart and aligned with said bolts, wherein said bolts are adapted to lie in said cutouts and closely adjacent said pipe when said clamp is installed.

5. The clamp described in claim 3 wherein said band member has integral concave end portions on said hook members, spaced apart and formed to fit partially around the underside of each said bolt.

6. A pipe repair clamp comprising a split flexible band member, the edges of the split portion having bent over portions adapted to form hooks, said bent over portions on each end of said flexible band having spaced apart slots cut out along the edges thereof, a pair of rigid lugs for said hooks, each lug having a main base portion and integral spaced apart boss portions thereon, said main base portion having an inclined lower surface terminating along an inner wall, each lug also having a bolt hole extending through each said boss portion and said main base portion and forming an opening in said inner wall and a recess in said lower inclined surface, each said lug having a slot means extending along its said inner wall and across said bolt holes, means on said base portion for retaining each said bent over portion on said band in said slot means, and bolts extending through said bolt holes in said lugs and through said slots in said band edges while lying closely adjacent to the outside surface of the pipe being repaired, said bolts being thereby adapted when tightened to apply a force on said lugs along a line substantially in alignment with the tension forces of said band pulling on said lugs.

7. A pipe repair clamp comprising a split flexible sleeve member, the edges of the split portion having bent over portions adapted to form hooks, a pair of rigid lugs for said hooks, each lug having a main body portion and integral spaced apart boss portions thereon, each said lug having an inclined lower surface terminating along an inner wall of said lug, each lug also having a bolt hole extending through each said boss portion and through a portion of said main body portion and forming an opening in said inner wall adjacent to said lower inclined surface, a slot means extending longitudinally along said inner wall of each said lug and across said bolt holes, said bent over portions on each end of said flexible sleeve having indented semi-cylindrical recesses formed at intervals along the edges thereof, said recesses being aligned with said bolt holes when each said hook on said sleeve member is attached to a said lug, and bolts extending through said bolt holes in said lugs and adapted to lie in said recesses in said sleeve edges while positioned closely adjacent to the outside surface of the pipe being repaired, said bolts being thereby adapted when tightened to apply a force on said lugs along a line substantially in alignment with the tension forces of said band pulling on said lugs.

References Cited by the Examiner

UNITED STATES PATENTS

| | | | |
|---|---|---|---|
| 2,127,456 | 8/38 | Adams | 138—99 |
| 2,599,882 | 6/52 | Adams | 24—279 |
| 2,703,111 | 3/55 | Smith | 138—99 |
| 2,713,352 | 7/55 | Schustack | 138—99 |
| 2,983,982 | 5/61 | Solum et al. | 24—279 |

FOREIGN PATENTS 281,834   7/52   Switzerland.

LEWIS J. LENNY, *Primary Examiner.*

EDWARD V. BENHAM, *Examiner.*